United States Patent
Tosconi et al.

(10) Patent No.: US 6,361,428 B1
(45) Date of Patent: Mar. 26, 2002

(54) VEHICLE VENTILATION SYSTEM

(75) Inventors: James J. Tosconi; Patrick J. Mattes, both of Fort Wayne, IN (US)

(73) Assignee: International Truck and Engine Corp., Warrenville, IL (US)

( * ) Notice: Subject to any disclaimer, the term of this patent is extended or adjusted under 35 U.S.C. 154(b) by 0 days.

(21) Appl. No.: 09/611,041

(22) Filed: Jul. 6, 2000

(51) Int. Cl.$^7$ ................................................ B60H 1/26
(52) U.S. Cl. ...................... 454/137; 454/138; 454/139; 454/99; 454/158
(58) Field of Search .................................. 454/136, 137, 454/138, 139, 158, 99, 228, 100, 105, 141, 142

(56) References Cited

U.S. PATENT DOCUMENTS

| | | | |
|---|---|---|---|
| 1,618,152 A | * | 2/1927 | Hutchins ...................... 454/138 |
| 1,956,123 A | * | 4/1934 | Givens ......................... 454/138 |
| 2,162,152 A | * | 6/1939 | Wulle ........................... 165/60 |
| 2,972,939 A | * | 2/1961 | Tomlinson ................... 454/137 |
| 3,159,089 A | * | 12/1964 | Eggert .......................... 454/99 |
| 3,520,355 A | * | 7/1970 | Rueth ........................... 454/99 |
| 3,648,591 A | * | 3/1972 | Winnett ....................... 454/158 |
| 3,910,623 A | | 10/1975 | McKeen |
| 4,189,987 A | | 2/1980 | Amberg |
| 4,193,339 A | | 3/1980 | Giles |
| 4,608,834 A | | 9/1986 | Rummel |
| 4,800,803 A | | 1/1989 | Farmont |
| 4,870,895 A | | 10/1989 | Mayer |
| 5,003,866 A | | 4/1991 | Ricci |
| 5,081,912 A | | 1/1992 | Clenet |
| 5,248,278 A | | 9/1993 | Fuerst |
| 5,342,238 A | | 8/1994 | Segerpalm |
| 5,344,361 A | | 9/1994 | Matthias |
| 5,690,549 A | | 11/1997 | Webb |
| 5,779,536 A | | 7/1998 | McCorkel |
| 5,918,972 A | | 7/1999 | Van Belle |
| 6,004,202 A | | 12/1999 | McCorkel |

* cited by examiner

Primary Examiner—Jiping Lu
(74) Attorney, Agent, or Firm—Jeffrey P. Calfa; Dennis Kelly Sullivan; Neil T. Powell (57) ABSTRACT

A vehicle ventilation system mounted to the upper portion of the exterior structure of a vehicle's occupant cabin. The components of the exterior structure of the occupant cabin define an opening through the exterior structure of the occupant cabin in the upper portion of the occupant cabin. A duct is mounted to the exterior structure of the occupant cabin and has a first end in fluid communication with the opening in the exterior structure of the occupant cabin. A second end of the duct is positioned below the first end of the duct and is open to and in fluid communication with the outside atmosphere. A fan is mounted to the exterior structure of the occupant cabin and is positioned such that when in operation it can be operated to move air through the opening in the exterior structure of the occupant cabin. The fan is controllable to change the rate and direction of the flow of air which it creates. A first rotary damper is mounted over the opening in the exterior structure of the occupant cabin and can be selectively opened or closed to allow or prevent air flow through the opening in the exterior structure of the occupant cabin. A second damper is mounted in a position such that it radially surrounds the impeller of the fan and can be used to control the flow of air radially outward from or radially inward toward the impeller of the fan.

10 Claims, 9 Drawing Sheets

VEHICLE VENTILATION SYSTEM

BACKGROUND OF THE INVENTION

This invention relates to a ventilation system for a vehicle. More specifically, the invention relates to a ventilation system, which is capable of actively or passively moving air between the upper region of the interior of the vehicle and the atmosphere outside the vehicle as well as circulating air within the upper region of the interior of the vehicle. The ventilation system is capable of actively moving air between the interior of the vehicle and the outside atmosphere whether the vehicle is stationary or moving. The ventilation system is also capable of actively or passively moving air between the interior of the vehicle and the outside atmosphere in rainy weather while preventing the entry of moisture through the ventilation system into the interior of the vehicle.

RELATED ART

In vehicles which have occupant cabins with high ceilings and heating ventilation and air conditioning (HVAC) systems with supply and return ducts concentrated near the lower portion of the occupant cabin, there is generally very little circulation or replacement of the air in the upper portion of the occupant cabin. Thus, it is often the case that the vehicle's HVAC system is not capable of rapidly effecting and maintaining a comfortable environment in the upper portion of the occupant cabin. When the vehicle's air conditioner is operated, the warm air in the upper portion of the vehicle interior is slow to mix with the cool air introduced into the lower portions of the occupant cabin by the vehicle's air conditioning system. Furthermore, because there is very little replacement of the air in the upper portion of the vehicle's interior, it can stagnate and become stale.

There exist a few designs, which aim to improve the condition of the environment in the upper portion of the occupant cabin. One such design is the inclusion of vent windows in the upper portion of the exterior structure of the occupant cabin to allow for fluid communication between the interior of the occupant cabin and the outside atmosphere when the vent windows are open. While this system allows for ventilation of the upper portion of the interior of the occupant cabin, it can not be utilized in rainy weather without introducing moisture into the interior of the occupant cabin. U.S. Pat. Nos. 5,779,536 and 6,004,202, disclose a design which has a ventilating duct with an inlet adjacent the ceiling of the vehicle interior and an outlet to the outside atmosphere near the floor of the vehicle interior. This design allows air to move between the upper portion of the interior of the vehicle and the atmosphere outside the vehicle. The design relies on positive cabin pressure, which is only achieved when the vehicle is moving forward, to actively move the air between the upper portion of the interior of the vehicle and the atmosphere outside the vehicle. Other systems disclosed in U.S. Pat. Nos. 4,189,987 and 5,081,912 and 5,690,549 show ventilation systems which are mounted to the roof of a vehicle's occupant cabin and have fans for actively moving air between the interior of the occupant cabin and the outside atmosphere.

SUMMARY OF INVENTION

As a result,—an object of the present invention is to provide a ventilation system 10 which is capable of actively or passively moving air between the upper portion of the interior 11 of the occupant cabin 12 and the outside atmosphere 13, whether the vehicle is stationary or in motion, under any weather conditions, without allowing the entry of moisture through the ventilation system 10 into the interior 11 of the vehicle.

The present invention is a ventilation system 10 for mounting to an upper portion of the exterior structure 14 of a vehicle's occupant cabin 12. One or more components 15 of the exterior structure 14 of the occupant cabin 12 define an opening 16 through the upper portion of the exterior structure 14 of the occupant cabin 12. Air can move through this opening 16 from the interior 11 of the occupant cabin 12 to outside the occupant cabin 12 and vice versa. A duct 17 is mounted to the vehicle. An outer wall 18 of a first end 19 of the duct 17 is mated to an outer surface 20 of one or more components 15 of the exterior structure 14 of the occupant cabin 12. The outer wall 18 of the first end 19 of the duct 17 surrounds at least a portion of the opening 16 in the exterior structure 14 of the occupant cabin 12. Thus the interior 21 of the duct 17 is in fluid communication with the opening 16 in the exterior structure 14 of the occupant cabin 12. A second end 22 of the duct 17 is positioned at a point below the first end 19 of the duct 17 and is open to, and in fluid communication with, the outside atmosphere 13. The ventilation system 10 has a fan 23, which is mounted to the vehicle. The fan 23 is mounted at a position such that either the inlet area 24 or the outlet area 25 of the fan 23 is located near, and is in fluid communication with, the opening 16 in the exterior structure 14 of the occupant cabin 12.

Figure 1:
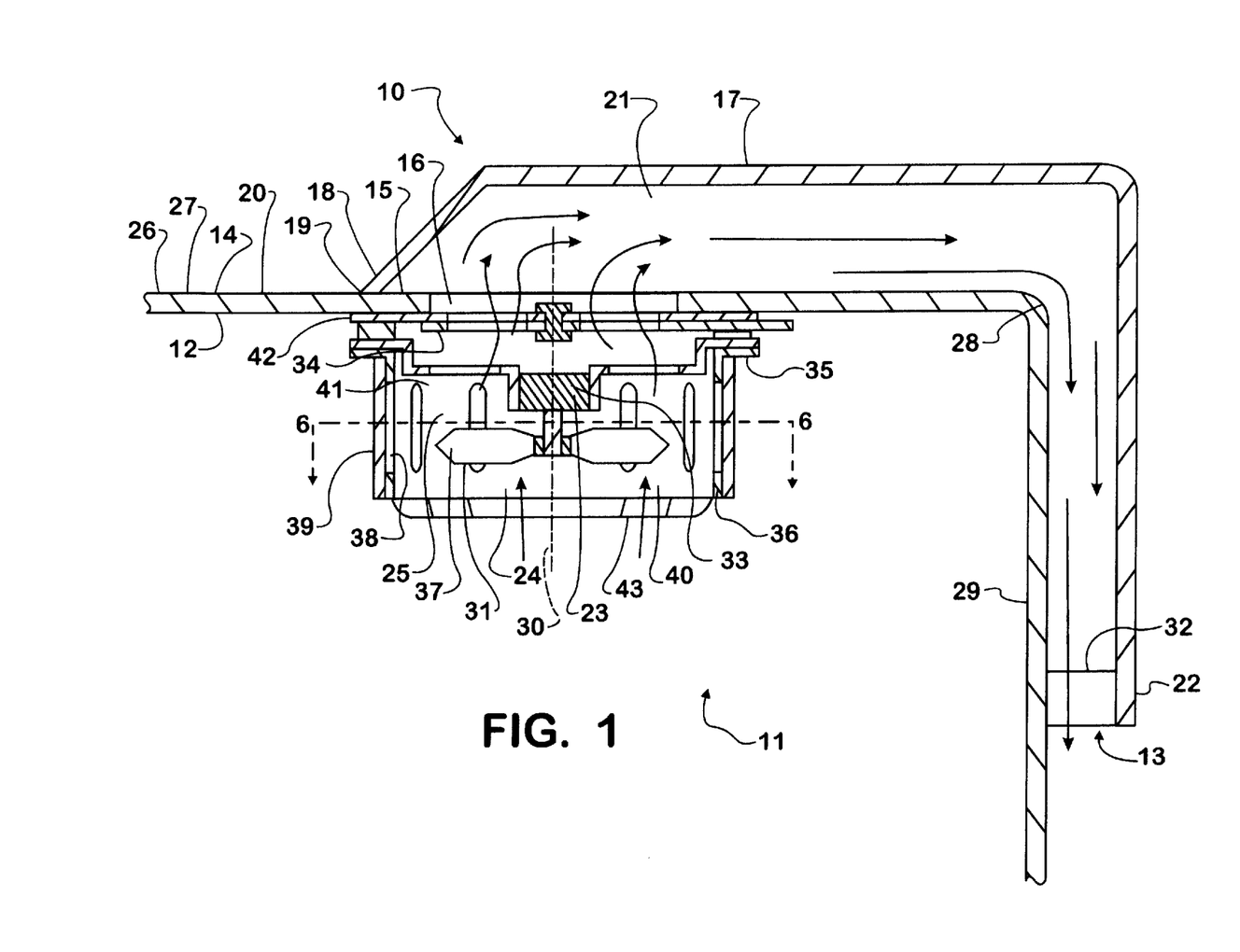
FIG. 1 is a sectional view of the ventilation system operating in an exhaust mode.

Thus the ventilation system 10 of the present invention accomplishes all of its objects. The fan 23 of the ventilation system 10 can be used to actively move air from the upper portion of the interior 11 of the occupant cabin 12, through the ventilation system 10, and into the outside atmosphere 13. This mode of operation of the ventilation system 10 is shown in FIG. 1. If the fan 23 is made to move air in the reverse direction the ventilation system 10 can move air from the outside atmosphere 13, through the ventilation system 10, and into the upper portion of the interior 11 of the occupant cabin 12. When the fan 23 is not in operation the ventilation system 10 passively moves air between the outside atmosphere 13 and the interior 11 of the vehicle's occupant cabin 12. Because the second end 22 of the duct 17 is positioned below the first end 19 of the duct 17, moisture is prevented from entering the interior 11 of the occupant cabin 12 through the ventilation system 10.

DRAWINGS

Other objects and advantages of the invention will become more apparent upon perusal of the detailed description thereof and upon inspection of the drawings in which.

DETAILS OF INVENTION

There is shown in FIGS. 1–9 a ventilation system 10, and a vehicle 40 for mounting the ventilation system to, in accordance with this invention. The vehicle 40 has a chassis, a suspension engaged to the chassis for supporting the vehicle 40, a powertrain engaged to the chassis for driving the vehicle 40 and an occupant cabin 12 engaged to the chassis for isolating the occupants of the vehicle 40 from the elements. One or more components 15 of the exterior structure 14 of the occupant cabin 12 define an opening 16 through the upper portion of the exterior structure 14 of the occupant cabin 12. Air can move through this opening 16 between the interior 11 of the occupant cabin 12 and outside the occupant cabin 12. A duct 17 is mounted to the vehicle. An outer wall 18 of a first end 19 of the duct 17 is mated to an outer surface 20 of one or more components 15 of the exterior structure 14 of the occupant cabin 12. The outer wall 18 of the first end 19 of the duct 17 surrounds at least a portion of the opening 16 in the exterior structure 14 of the occupant cabin 12. Thus, the interior 21 of the duct 17 is in fluid communication with the opening 16 in the exterior atmosphere 13. The ventilation system 10 has a fan 23, which is mounted to the vehicle 40. The fan 23 is mounted at a position such that either an inlet area 24 or an outlet area 25 of the fan 23 is located near, and is in fluid communication with, the opening 16 in the exterior structure 14 of the occupant cabin 12.

In the preferred embodiment, the ventilation system 10 is fixed to the roof 26 of the sleeper portion of an occupant cabin 12 on a truck vehicle. In this preferred embodiment the one or more components 15 of the exterior structure 14 of the occupant cabin 12 are part of the roof 26 of the occupant cabin 12. The duct 17 of the ventilation system 10 is plastic and is fixedly attached to the exterior 27 of the roof 26 of the sleeper portion of the occupant cabin 12. The outer wall 18 of the first end 19 of the duct 17 is mated to the exterior 27 of the roof 26 of the sleeper portion of the occupant cabin 12 and surrounds the opening 16 in the roof 26. Thus, the interior 21 of the duct 17 is placed in fluid communication with the upper portion of the interior 11 of the sleeper portion of the occupant cabin 12. The duct 17, extends from this first end 19, along the roof 26 of the occupant cabin 12, to an outer edge 28 of the roof 26. From there the duct 17 extends down a side or rear panel 29 of the occupant cabin 12 and terminates at the second end 22 of the duct 17. The second end 22 of the duct 17 is open to the outside atmosphere 13 and is positioned substantially below the first end 19 of the duct 17. Because the second end 22 of the duct 17 is positioned substantially below the first end 19 of the duct 17, moisture is prevented from traveling through the ventilation system 10 into the interior 11 of the occupant cabin 12. In the preferred embodiment, a debris screen 32 is mounted within the interior 21 of the duct 17 and completely covers a cross section of the interior 21 of the duct 17. This debris screen 32 prevents foreign matter from the outside atmosphere 13 from traveling into the interior 11 of the occupant compartment 12. In the preferred embodiment, the fan 23 of the ventilation system 10, is mounted to the exterior structure 14 of the occupant cabin 12, in a position below the opening 16 in the exterior structure 14 of the occupant cabin 12. The fan 23 is positioned with the axis of rotation 30 of its impeller 31 generally perpendicular to the roof 26 of the occupant cabin 12 and generally centered in the opening 16 in the exterior structure 14 of the occupant cabin 12. Thus, when the fan 23 is in operation it tends to move air directly toward or directly away from the opening 16 in the roof 26 of the occupant cabin 12.

Figure 2:
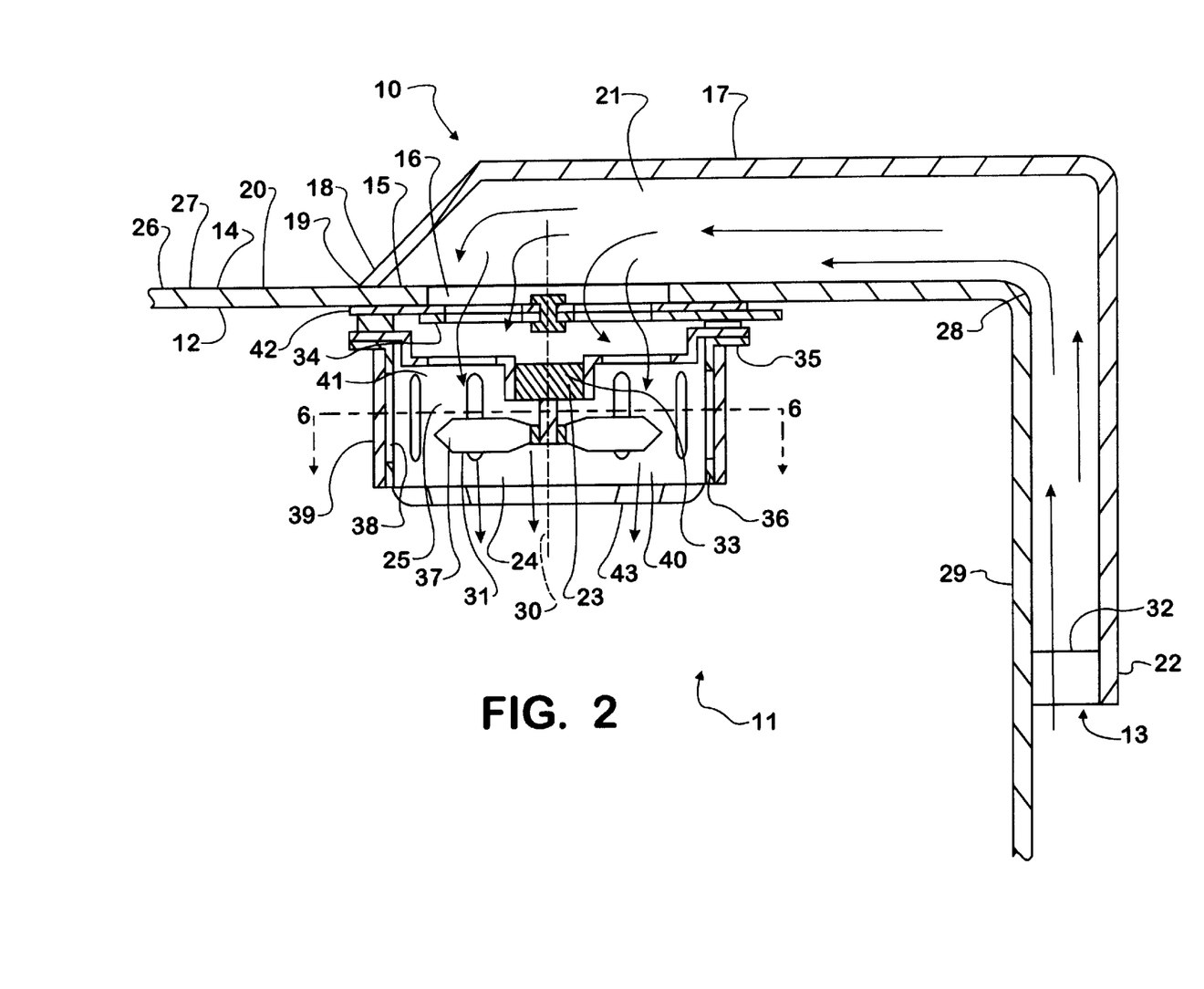
FIG. 2 is a sectional view of the ventilation system operating in a fresh air in mode.
Figure 3:
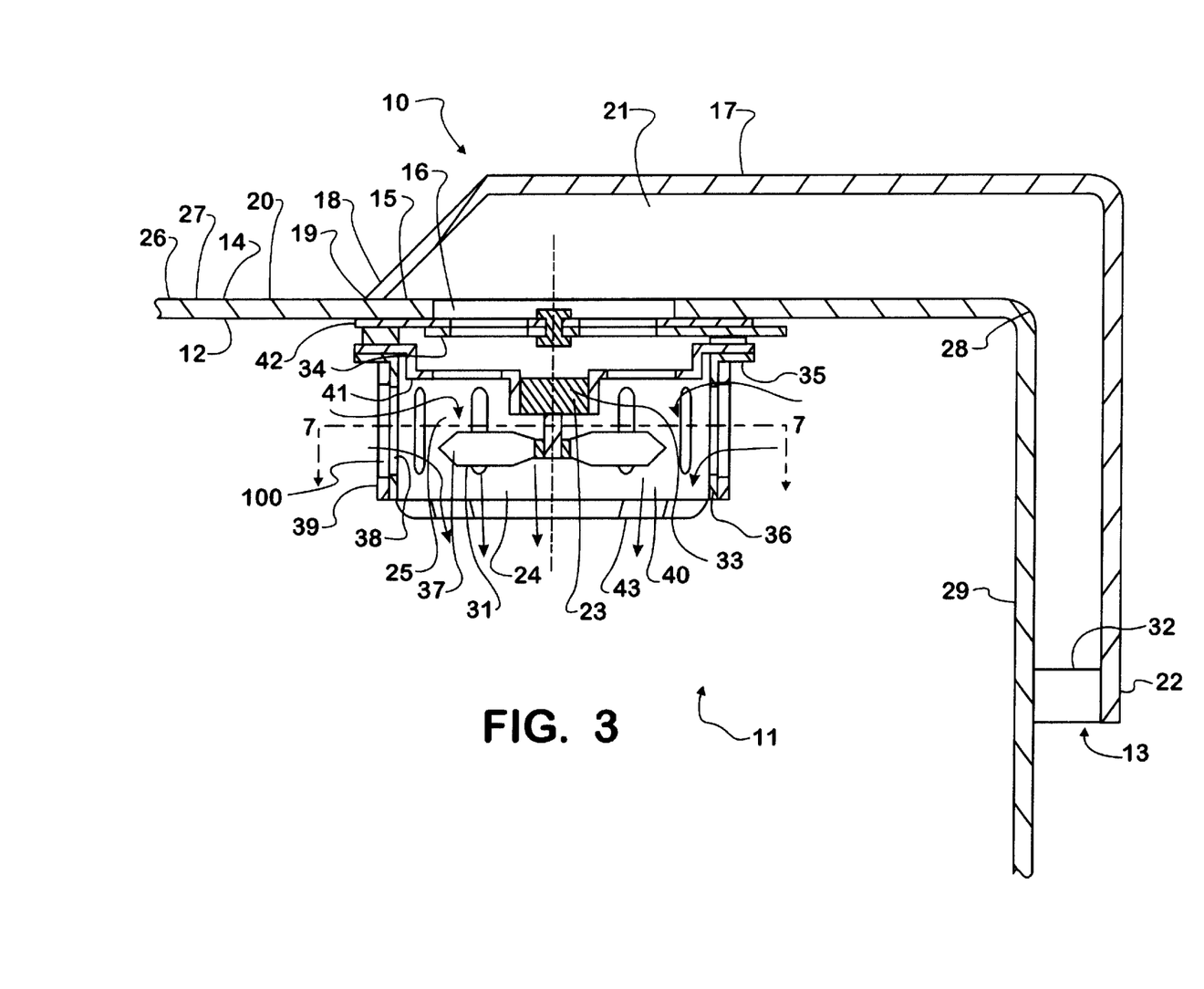
FIG. 3 is a sectional view of the ventilation system operating in a circulation mode.

The fan 23 may have more than one mode of operation with different rates and or directions of airflow being created in the different modes of operation. The fan 23 may have a first mode of operation in which it moves air toward the interior 11 of the occupant cabin 12, as shown in FIGS. 2 and 3. The fan 23 may also have a second mode, in which, it moves air toward the opening 16 in the exterior structure 14 of the occupant cabin 12, as shown in FIG. 1. The fan 23 may also be controllable to vary the rate of the airflow created. The fan 23 may have numerous different designs, which allow it to selectively change the direction and rate of the airflow it creates. The direction and speed of movement of the impeller 31 of the fan 23 may be controlled or the orientation of the impeller blades 37 may be controlled. In fact, a fan 23, of any design, which can be manipulated to control the rate and/or direction of the airflow it creates, is suitable. In the preferred embodiment, the impeller 31 of the fan 23 is powered by a variable speed, reversible, electric DC motor 33.

Figure 4:
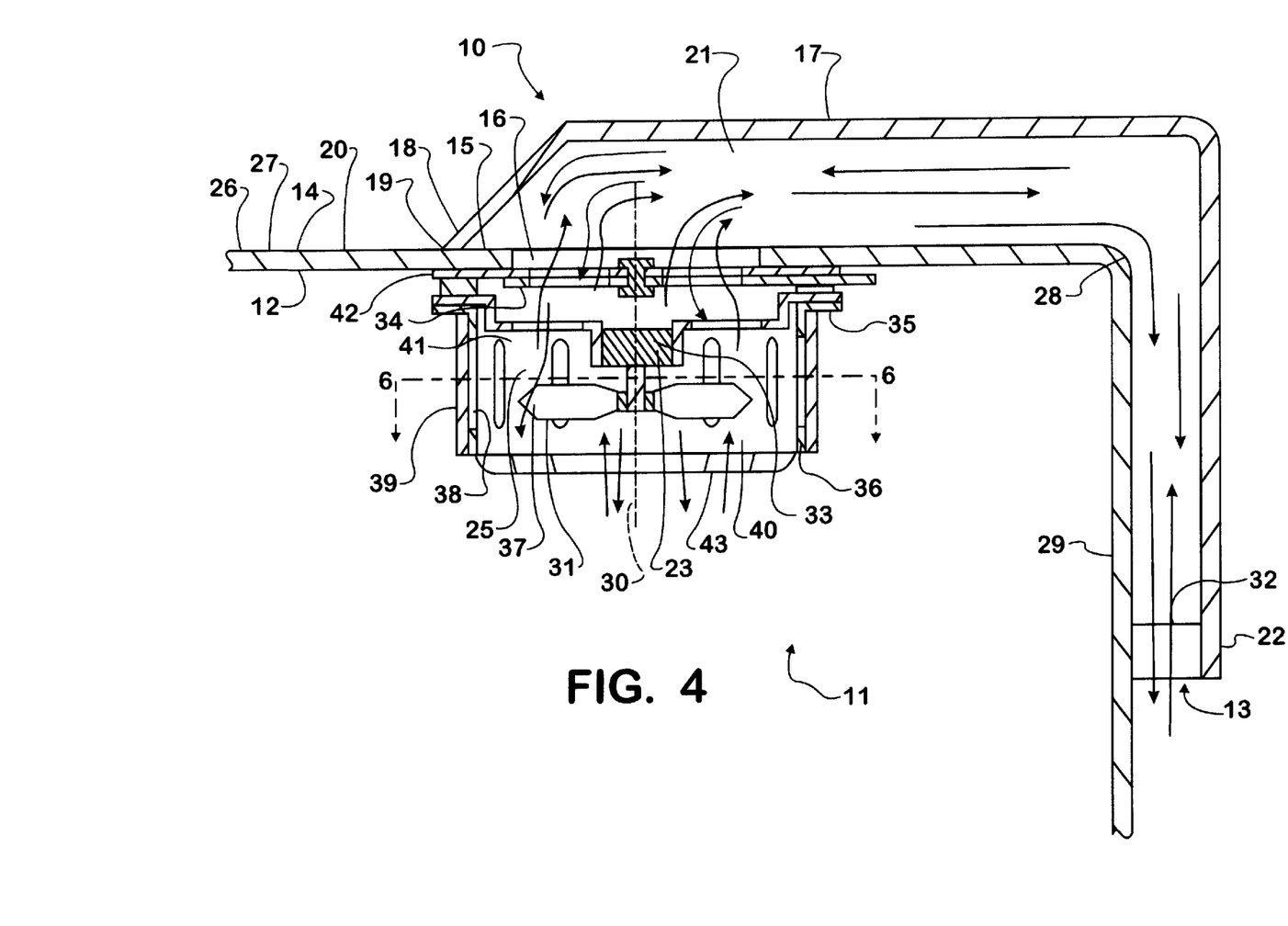
FIG. 4 is a sectional view of the ventilation system operating in a flow through mode.
Figure 5:
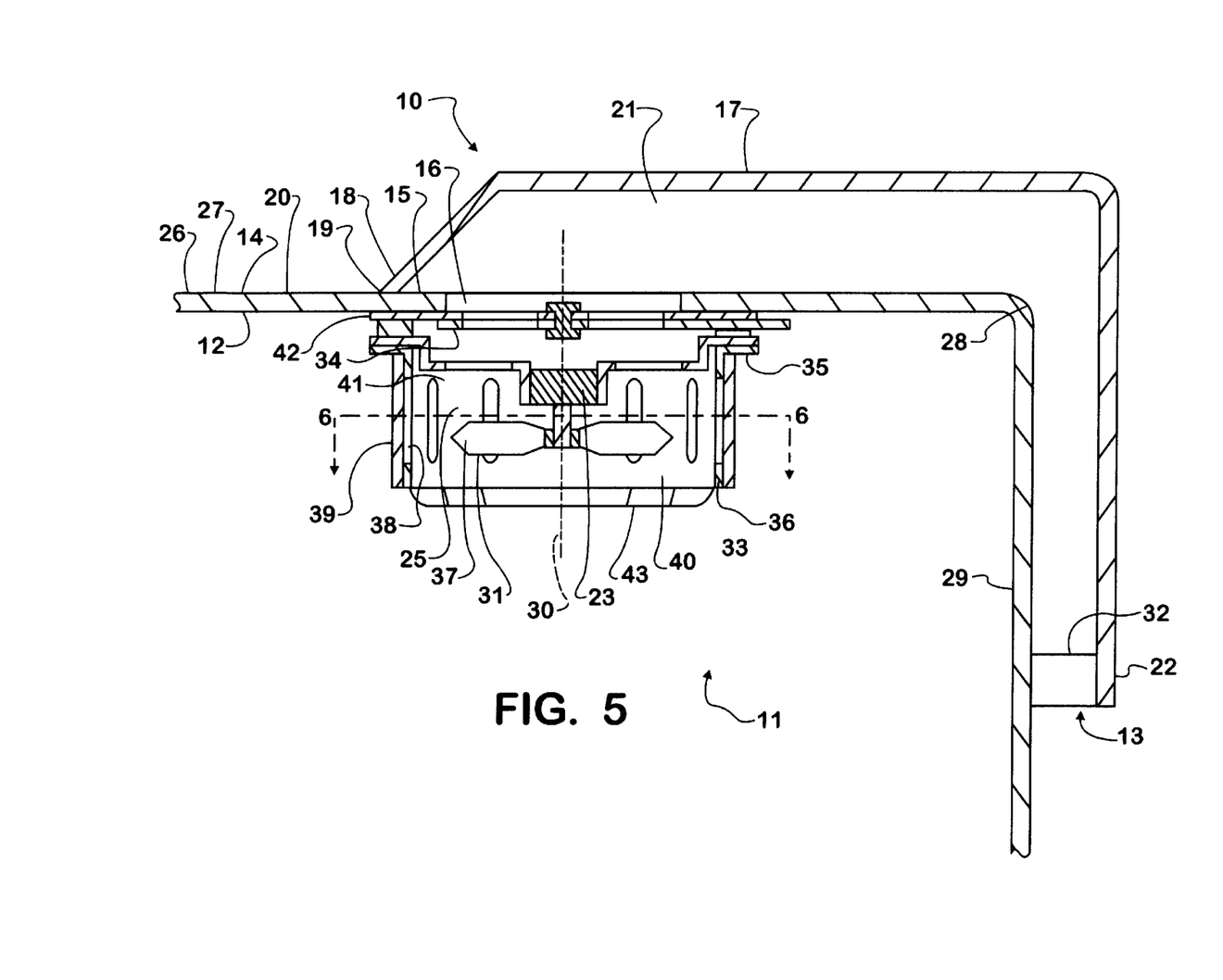
FIG. 5 is a sectional view of the ventilation system not in operation.
Figure 6:
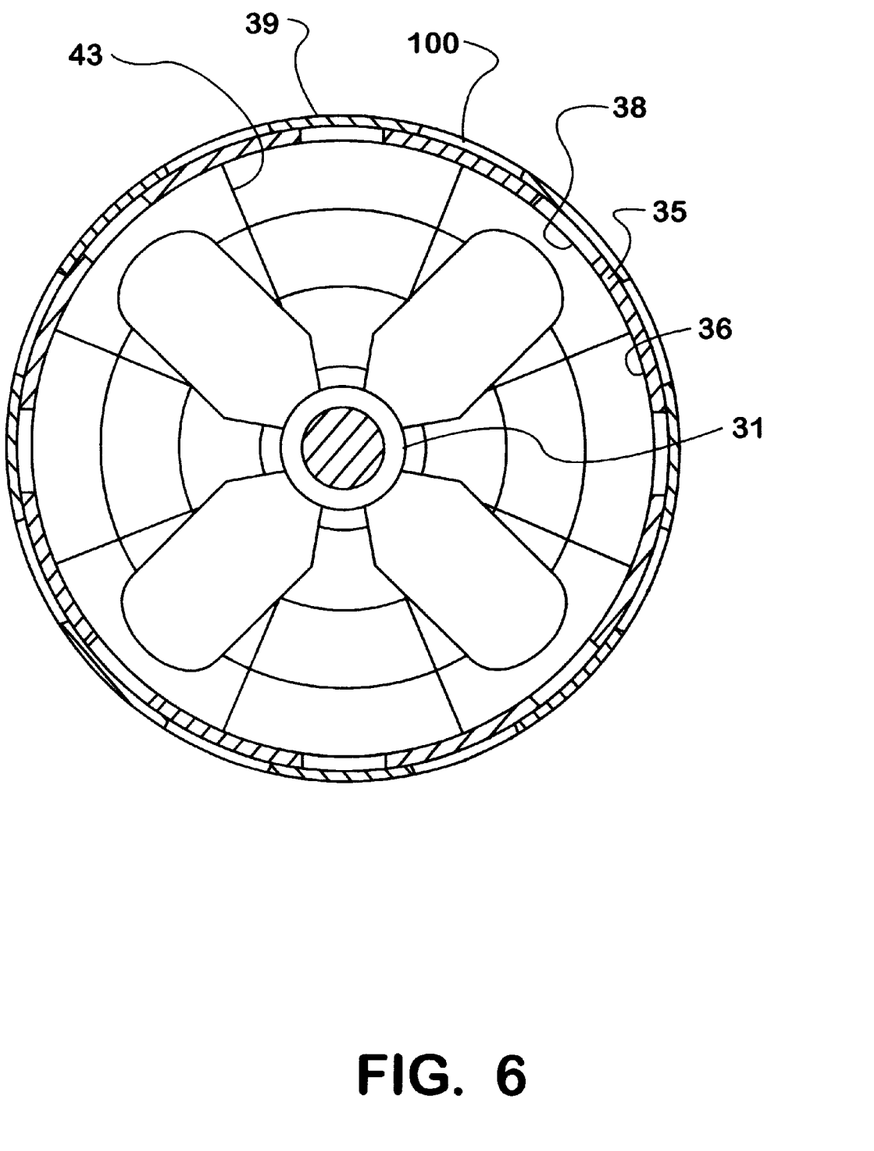
FIG. 6 is a sectional view of the ventilation system taken along line 6—6 of FIGS. 1, 2, 4, and 5, showing the air control gate positioned in a manner such that the openings defined in the outer wall of the second damper are covered.

The ventilation system 10 may further include a first damper 34 for selectively allowing or preventing the flow of air between the interior 11 of the occupant cabin 12 and the duct 17 attached to the vehicle. The first damper 34 may be of many forms. The first damper 34 may be mounted directly or indirectly to the exterior structure 14 of the occupant cabin 12. The first damper 34 is positioned at a location where it can be used to selectively cover, as shown in FIGS. 3 and 5, or expose, as shown in FIGS. 1, 2, and 4, the opening 16 in the exterior structure 14 of the occupant cabin 12. Thus, the first damper 34 is operable, depending on its state, to allow or prevent fluid communication between the interior 11 of the occupant cabin 12 and the duct 17. In the preferred embodiment, the first damper 34, is a rotary style damper, which is well known in the art, and is mounted directly over the opening 16 in the exterior structure 14 of the occupant cabin 12. Thus, the first damper 34 may be opened and air is allowed to move in either direction between the occupant cabin 12 and the outside atmosphere 13. When the first damper 34 is closed the interior 11 of the occupant cabin 12 is isolated from the duct 17 of the ventilation system 10. When the first damper 34, is closed the fan 23 can be operated to circulate air within the occupant cabin 12, as shown in FIG. 3. Operating the ventilation system 10 to circulate air within the interior 11 of the occupant cabin 12 is particularly beneficial when the air in the lower portion of the interior 11 of the occupant cabin 12 is colder than desired. The ventilation system 10 can be used to circulate the warm air concentrated in the upper portion of the occupant cabin 12 throughout the rest of the occupant cabin 12, and more rapidly heat the lower portion of the occupant cabin 12.

Figure 7:
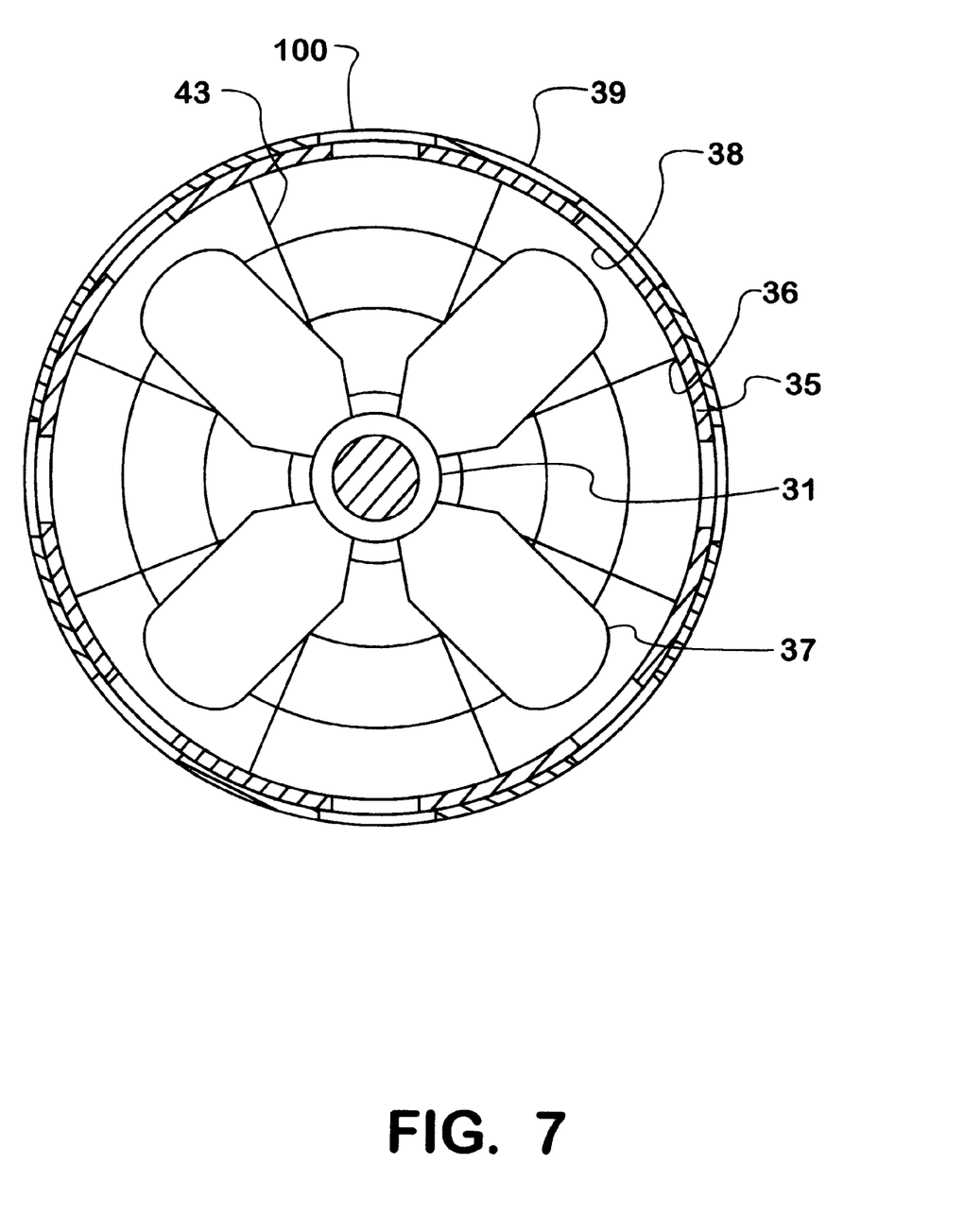
FIG. 7 is a sectional view of the ventilation of the ventilation system taken along line 7—7 of FIG. 3, showing the air control gate positioned in a manner such that the openings defined in the outer wall of the second damper are exposed.
Figure 8:
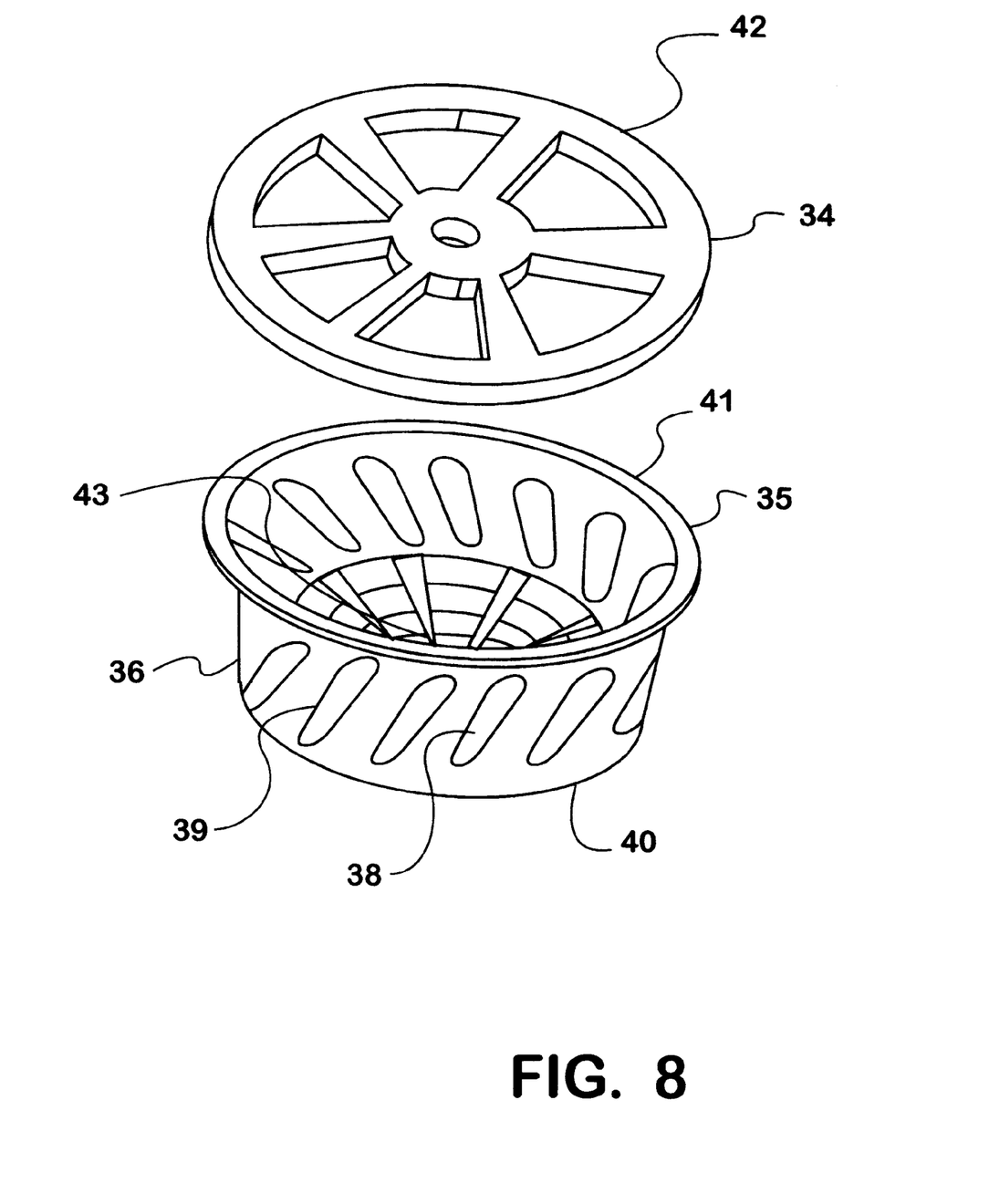
FIG. 8 is a perspective view of the first rotary damper, the second damper, and the wire form safety screen of the invention.
Figure 9:
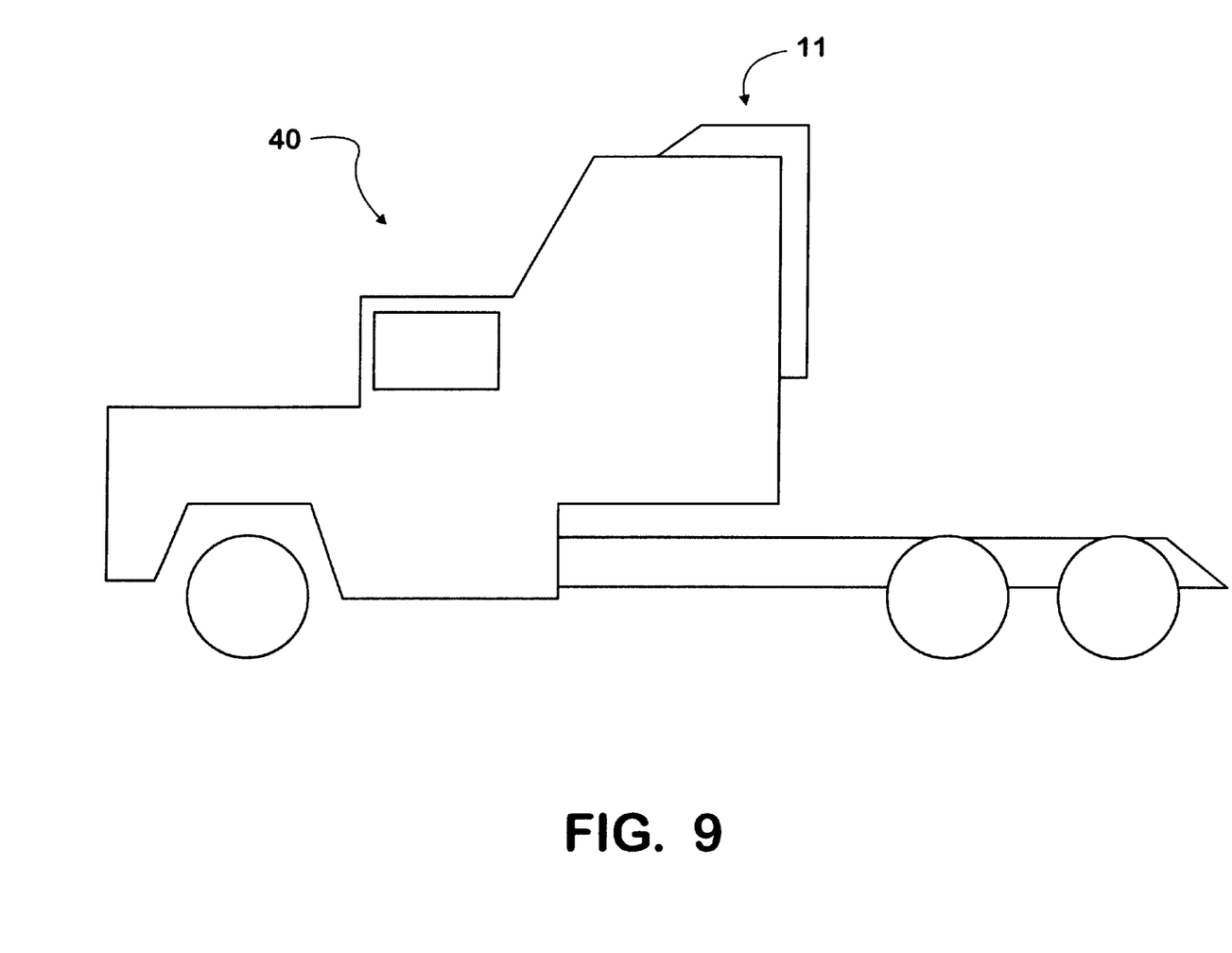
FIG. 9 is a side view of a vehicle with the ventilation system mounted.

The ventilation system 10 of the present invention may further include a second damper 35 mounted to the vehicle directly or indirectly. The second damper 35 of the ventilation system 10 would be positioned such that an outer wall 36 of the second damper 35 at least partially surrounds the impeller 31 of the fan 23. The outer wall 36 of the second damper 35 defines a plurality of openings 38 through which air can pass. An air control gate 39 surrounds the outer wall 36 of the second damper 35. The air control gate 39 defines a plurality of openings 100 through itself. These plurality of openings 100 defined in the air control gate are disposed regularly around the periphery of the air control gate 39 with the distance between openings being similar to the distance between openings defined in the outer wall 36 of the second damper 35. The air control gate 39 can be rotated about the outer wall 36 of the second damper 35. The openings 100 in the air control gate 39 can, thus, be positioned either in alignment or out of alignment with the openings 38 defined in the outer wall 36 of the second damper 35. FIGS. 1, 2, 4, 5, and 6 show the air control gate 39 in a position such that the openings 100 defined in the air control gate 39 are not aligned with the openings 38 defined in the outer wall 36 of the second damper 35. With the air control gate 39 in this position the openings 38 in the outer wall 36 of the second damper are thus covered by the air control gate 39. FIGS. 3 and 7 show the air control gate 39 in a position such that the openings 100 defined in the air control gate 39 are aligned with the openings 38 defined in the outer wall 36 of the second damper 35. With the air control gate 39 in this position the openings 38 in the outer wall 36 of the second damper are thus exposed by the openings 100 defined in the air control gate 39. Thus, airflow through the openings 38 in the outer wall 36 of the second damper 35 can be selectively prevented or allowed by covering or exposing the openings 38 defined in the outer wall 36 of the second damper 35.

In the preferred embodiment, the second damper 35 has a generally cylindrical outer wall 36, which is open at both its inner end 40 and its outer end 41. The outer end 41 of the second damper 35 is fixedly attached to the base plate 42 of the first damper 34 of the ventilation system 10, to one or more components 15 of the exterior structure 14 of the occupant cabin 12, or to the fan 23. The second damper 35 is positioned such that the axis of its cylindrical outer wall 36 is generally parallel to the axis of rotation 30 of the impeller 31 of the fan 23. The cylindrical outer wall 36 of the second damper 35 is disposed radially outward of and surrounds the impeller 31 of the fan 23. As was described above the air control gate 39 can be selectively positioned to either cover or expose the openings 38 defined in the outer wall 36 of the second damper 35. Thus, the second damper 35 can be used to allow or prevent the flow of air radially inward toward or radially outward from the impeller 31 of the fan 23 through the damper 35, and to further control the direction of that airflow.

Structure may be present to prevent foreign objects from contacting the impeller 31 of the fan 23. This structure is in the form of a wire form safety screen 43, which covers openings through which foreign objects could otherwise enter the space generally coincident with the impeller 31 of the fan 23. In the preferred embodiment of the ventilation system 10, the opening in the inner end 40 of the second damper 35 is the only opening through which foreign objects could travel and enter the space generally coincident with the impeller 31 of the fan 23. Therefore, in the preferred embodiment, a circular wire form safety screen 43 is fixedly attached to the inner end 40 of the second damper 35 to prevent foreign objects from entering the space generally coincident with the impeller 31 of the fan 23.

In summary, the present invention is a ventilation system 10 for the occupant cabin 12 of a vehicle 40. The exterior structure 14 of the vehicle's occupant cabin 12 defines an opening 16 in its upper portion through which air can travel between outside the occupant cabin 12 and the interior 11 of the occupant cabin 12. In the preferred embodiment this opening 16 is in the roof 26 of the occupant cabin 12. A duct 17 is attached to the vehicle and has an outer wall 18 at a first end 19 which mates with the outer surface 27 of the roof 26 of the occupant cabin 12 and surrounds the opening 16 in the roof 26 of the occupant cabin 12. Thus the interior 21 of the duct 17 is in fluid communication with the interior 11 of the occupant cabin 12. The second end 22 of the duct 17 is open to and in fluid communication with the outside atmosphere 13. The second end 22 of the duct 17 is positioned below the first end 19 of the duct 17 so that during rainy weather moisture will not travel through the duct 17 to the first end 19 of the duct 17 and into the occupant cabin 12. A fan 23 is mounted, directly or indirectly, to one or more components 15 of the exterior structure 14 of the occupant cabin 12. The fan 23 is positioned adjacent to the opening 16 in the exterior structure 14 of the occupant cabin 12. The fan is oriented such that when in operation the fan 23 moves air directly toward or directly away from the opening 16 in the exterior structure 14 of the occupant cabin 12. In the preferred embodiment, the flow of air created by the fan 23 can be controlled in magnitude and reversed in direction. In the preferred embodiment, the ventilation system 10 has a first damper 34 fixedly attached over the opening 16 in the exterior structure 14 of the occupant cabin 12. When the first damper 34 is open, the interior 11 of the occupant cabin 12 is in fluid communication with the interior 21 of the duct 17. When the first damper 34 is closed, the interior 11 of the occupant cabin 12 is isolated from the interior 21 of the duct 17. The preferred embodiment further includes a second damper 35. The second damper 35 has a cylindrical outer wall 36, is open at its inner end 40 and its outer end 41, and defines openings 38 in its outer wall 36 which can be selectively covered or exposed by the moveable air control gate 39. The second damper 35 is positioned such that its cylindrical outer wall 36 surrounds the impeller 31 of the fan 23. Finally, the ventilation system 10 has wire form safety screen 43 fixedly attached to some portion of the ventilation system 10 or the vehicle, in such a position to prevent foreign objects from entering the space occupied by the impeller 31 of the fan 23.

Thus the ventilation system 10 of this invention has many functions. The ventilation system 10 can be used to exhaust air from the occupant cabin 12 as is shown in FIG. 1. This is accomplished by opening the first damper 34, covering the openings 38 defined in the outer wall 36 of the second damper 35, and operating the fan 23 to force air from the interior 11 of the occupant cabin; through the duct 17, and into the outside atmosphere 13. The ventilation system 10 can also be used to draw fresh air from the outside atmosphere 13 into the interior 11 of the occupant cabin 12 as is shown in FIG. 2. This is accomplished by opening the first damper 34, covering the openings 38 in the outer wall 36 of the second damper 35, and operating the fan 23 to create airflow from the outside atmosphere 13, through the duct 17, and into the interior 11 of the occupant cabin 12. The ventilation system 10 can be used to circulate air within the interior 11 of the occupant cabin 12, as is shown in FIG. 3. In this circulation mode, the first damper 34 is closed, the openings 38 defined in the outer wall 36 of the second damper 35 are exposed, and the fan 23 is operated to create airflow toward the interior 11 of the occupant cabin 12. The ventilation system 10 can also be operated in a passive flow through mode as is shown in FIG. 4. In this passive flow through ventilation mode the first damper 34 is opened, the openings 38 defined in the outer wall 36 of the second damper 35 are covered, and the fan 23 is not operated.

Those skilled in the art will appreciate that modifications could be made to the invention as described without departing from the spirit and scope of the invention and thus the scope of the invention is intended to be limited only by the following claims.

We claim:

1. A ventilation system, for mounting to a vehicle which has an occupant cabin which surrounds an interior of the occupant cabin and is surrounded by an exterior of the occupant cabin, wherein the occupant cabin has an exterior structure, and a roof, sides and rear panel, all of which have an inner and an outer surface and outer edges, and make up part of the exterior structure of the occupant cabin, and wherein one or more components of the exterior structure of the occupant cabin define an opening through an upper portion of the exterior structure of the occupant cabin, comprising:

(a) a duct mountable to the occupant cabin;
(b) an outer wall of a first end of said duct, which can be mated to the outer surface of the one or more components of the exterior structure which define(s) the opening in the exterior structure of the occupant cabin, wherein said outer wall of said first end of said duct is designed to at least partially surround the opening in the exterior structure of the occupant cabin when said ventilation system is installed, thus, an interior of said duct would be in fluid communication with the opening in the exterior structure of the occupant cabin when said ventilation system is installed;
(c) a second end of said duct, which is designed to be positioned below said first end of said duct when said ventilation system is installed;
(d) wherein said second end of said duct is designed to be open to and in fluid communication with outside atmosphere when said ventilation system is installed;
(e) a fan designed to be mounted to the occupant cabin in a position such that an inlet or exhaust area of said fan would be near and would be in fluid communication with the opening in the exterior structure of the occupant cabin when said ventilation system is installed and thus when said fan is in operation it would create air flow toward or away from the opening in the exterior structure of the occupant cabin when said ventilation system is installed;
(f) wherein said duct is designed to be mountable to the exterior surface of the roof of the occupant cabin;
(g) wherein said duct is designed to extend along the roof of the exterior structure of the occupant cabin to one of the outer edges of the roof, and then down along a side or rear panel of the exterior structure of the occupant cabin, and terminate at said second end of said duct;
(h) a first damper designed to be mounted to the occupant cabin, in a position near the opening in the exterior structure of the occupant cabin, whereby when said ventilation system is installed said first damper can be selectively opened, which places the interior of the occupant cabin in fluid communication with said duct, or closed, which effectively isolates the occupant cabin from said duct;
(i) wherein said fan is constructed such that, a speed or direction of motion of an impeller of said fan, or an orientation of one or more blades of said impeller of said fan can be controlled, such that a rate or direction of an air flow created by said fan can be controlled;
(j) a second damper designed to be mounted to the occupant cabin, in a position such that it would surround at least a portion of said impeller of said fan;
(k) an outer wall of said second damper which defines openings through which air can pass;
(l) an air control gate disposed such that said air control gate surrounds said outer wall of said second damper;
(m) wherein said air control gate defines openings through itself which are positioned around a periphery of said air control gate;
(n) wherein a distance between said openings defined in said air control gate is similar to a distance between said openings defined in said outer wall of said second damper; and
(o) wherein said air control gate can be rotated such that said openings defined in said air control gate can be placed into or out of alignment with said openings in said outer wall of said second damper such that said openings in said outer wall of said second damper can be selectively exposed or covered by said air control gate.

2. The ventilation system of claim 1, further comprising:
(a) one or more wire form safety screens designed to be fixedly attached to the occupant cabin or components of said ventilation system;
(b) wherein said wire form safety screen(s) cover(s) one or more openings in said ventilation system through which foreign objects could otherwise travel and enter a space generally coincident with said impeller of said fan;
(c) a debris screen mounted inside said duct near said second end of said duct; and
(d) wherein said debris screen covers an entire cross section of an interior of said duct, such that debris from the outside atmosphere is prevented from traveling through the ventilation system into the interior of the occupant cabin when said ventilation system is installed.

3. A ventilation system, for mounting to a vehicle which has an occupant cabin which surrounds an interior of the occupant cabin and is surrounded by an exterior of the occupant cabin, wherein the occupant cabin has an exterior structure, and a roof, sides and rear panel, all of which have an inner and an outer surface and outer edges, and make up part of the exterior structure of the occupant cabin, and wherein one or more components of the exterior structure of the occupant cabin define an opening through an upper portion of the exterior structure of the occupant cabin, comprising:

(a) a duct mountable to the occupant cabin;
(b) an outer wall of a first end of said duct, which can be mated to the outer surface of the one or more components of the exterior structure which define(s) the opening in the exterior structure of the occupant cabin, wherein said outer wall of said first end of said duct is designed to at least partially surround the opening in the exterior structure of the occupant cabin when said ventilation system is installed, thus, an interior of said duct would be in fluid communication with the opening in the exterior structure of the occupant cabin when said ventilation system is installed;
(c) a second end of said duct, which is designed to be positioned below said first end of said duct when said ventilation system is installed;
(d) wherein said second end of said duct is designed to be open to and in fluid communication with outside atmosphere when said ventilation system is installed; and
(e) a fan designed to be mounted to the occupant cabin in a position such that an inlet or exhaust area of said fan would be near and would be in fluid communication with the opening in the exterior structure of the occupant cabin when said ventilation system is installed and thus when said fan is in operation it would create air flow toward or away from the opening in the exterior structure of the occupant cabin when said ventilation system is installed;

(f) a first damper designed to be mounted to the occupant cabin, in a position near the opening in the exterior structure of the occupant cabin, whereby when said ventilation system is installed said first damper can be selectively opened, which places the interior of the occupant cabin in fluid communication with said duct, or closed, which effectively isolates the occupant cabin from said duct;

(g) wherein said fan is constructed such that, a speed or direction of motion of an impeller of said fan, or an orientation of one or more blades of said impeller of said fan can be controlled, such that a rate or direction of an air flow created by said fan can be controlled;

(h) a second damper designed to be mounted to the occupant cabin, in a position such that it would surround at least a portion of said impeller of said fan;

(i) an outer wall of said second damper which defines openings through which air can pass;

(j) an air control gate disposed such that said air control gate surrounds said outer wall of said second damper;

(k) wherein said air control gate defines openings through itself which are positioned around a periphery of said air control gate;

(l) wherein a distance between said openings defined in said air control gate is similar to a distance between said openings defined in said outer wall of said second damper; and (m) wherein said air control gate can be rotated such that said openings defined in said air control gate can be placed into or out of alignment with said openings in said outer wall of said second damper such that said openings in said outer wall of said second damper can be selectively exposed or covered by said air control gate.

4. The ventilation system of claim 3, further comprising:

(a) one or more wire form safety screens designed to be fixedly attached to the occupant cabin or components of said ventilation system;

(b) wherein said wire form safety screen(s) cover(s) one or more openings in said ventilation system through which foreign objects could otherwise travel and enter a space generally coincident with said impeller of said fan;

(c) a debris screen mounted inside said duct near said second end of said duct; and (d) wherein said debris screen covers an entire cross section of an interior of said duct, such that debris from the outside atmosphere is prevented from traveling through the ventilation system into the interior of the occupant cabin when said ventilation system is installed.

5. A vehicle, comprising:

(a) a chassis;

(b) a suspension engaged to said chassis for supporting said vehicle;

(c) a powertrain engaged to said chassis for driving said vehicle;

(d) an occupant cabin engaged to said chassis;

(e) an exterior structure of said occupant cabin which is comprised of a floor, two sides, a rear panel and a roof;

(f) one or more components of said exterior structure of said occupant cabin defining an opening through said exterior structure in an upper portion of said occupant cabin, such that, air can move through said opening in said exterior structure between an interior space of said occupant cabin and the outside atmosphere;

(g) a duct mounted to said occupant cabin;

(h) an outer wall of a first end of said duct, mated to an outer surface of said one or more components of said exterior structure which define(s) said opening in said exterior structure of said occupant cabin, wherein said outer wall of said first end of said duct at least partially surrounds said opening in said exterior structure of said occupant cabin, thus an interior of said duct is in fluid communication with said opening in said exterior structure of said occupant cabin;

(i) a second end of said duct, positioned below said first end of said duct;

(j) wherein said second end of said duct is open to and in fluid communication with the outside atmosphere;

(k) a fan mounted to said occupant cabin in a position such that an inlet or exhaust area of said fan is near and is in fluid communication with said opening in said exterior structure of said occupant cabin and thus when said fan is operated it creates an air flow toward or away from said opening in said exterior structure of said occupant cabin;

(l) wherein said one or more components of said exterior structure of said occupant cabin which define said opening in said occupant cabin are part of said roof of said occupant cabin;

(m) wherein said opening through said exterior structure of said occupant cabin is therefore located in said roof of said exterior structure of said occupant cabin;

(n) wherein said duct is mounted to an exterior surface of said roof of said occupant cabin;

(o) wherein said duct extends from said first end along said roof of said exterior structure of said occupant cabin to an outer edge of said roof and then down along an outer surface of one of said side or rear panels of said exterior structure of said occupant cabin and terminates at said second end of said duct;

(p) a first damper mounted to said occupant cabin, in a position near said opening in said exterior structure of said occupant cabin, whereby said first damper can be selectively opened, which places the interior of said occupant cabin in fluid communication with said duct, or closed, which effectively isolates said occupant cabin from said duct;

(q) wherein said fan is constructed such that, a speed or direction of motion of an impeller of said fan, or an orientation of one or more blades of said impeller of said fan can be controlled, such that a rate or direction of an air flow created by said fan can be controlled;

(r) a second damper designed to be mounted to said occupant cabin, in a position such that it would surround at least a portion of said impeller of said fan;

(s) an outer wall of said second damper which defines openings through which air can pass;

(t) an air control gate disposed such that said air control gate surrounds said outer wall of said second damper;

(u) wherein said air control gate defines openings through itself which are positioned around a periphery of said air control gate;

(v) wherein a distance between said openings defined in said air control gate is similar to a distance between said openings defined in said outer wall of said second damper; and (w) wherein said air control gate can be rotated such that said openings defined in said air control gate can be placed into or out of alignment with said openings in said outer wall of said second damper such that said openings in said outer wall of said second damper can be selectively exposed or covered by said air control gate.

6. The Vehicle of claim 5, further comprising:

(a) one or more wire form safety screens fixedly attached to said occupant cabin or components of said ventilation system; and (b) wherein said wire form safety screens cover one or more openings in said ventilation system through which foreign objects could otherwise travel and enter a space generally coincident with said impeller of said fan.

(c) a debris screen mounted inside said duct near said second end of said duct;

(d) wherein said debris screen covers an entire cross section of an interior of said duct such that debris from the outside atmosphere is prevented from traveling through said ventilation system into the interior of said occupant cabin.

7. A vehicle, comprising:

(a) a chassis;

(b) a suspension engaged to said chassis for supporting said vehicle;

(c) a powertrain engaged to said chassis for driving said vehicle;

(d) an occupant cabin engaged to said chassis;

(e) an exterior structure of said occupant cabin which is comprised of a floor, two sides, a rear panel and a roof;

(f) one or more components of said exterior structure of said occupant cabin defining an opening through said exterior structure in an upper portion of said occupant cabin, such that, air can move through said opening in said exterior structure between an interior space of said occupant cabin and the outside atmosphere;

(g) a duct mounted to said occupant cabin;

(h) an outer wall of a first end of said duct, mated to an outer surface of said one or more components of said exterior structure which define(s) said opening in said exterior structure of said occupant cabin, wherein said outer wall of said first end of said duct at least partially surrounds said opening in said exterior structure of said occupant cabin, thus an interior of said duct is in fluid communication with said opening in said exterior structure of said occupant cabin;

(i) a second end of said duct, positioned below said first end of said duct;

(j) wherein said second end of said duct is open to and in fluid communication with the outside atmosphere;

(k) a fan mounted to said occupant cabin in a position such that an inlet or exhaust area of said fan is near and is in fluid communication with said opening in said exterior structure of said occupant cabin and thus when said fan is operated it creates an air flow toward or away from said opening in said exterior structure of said occupant cabin;

(l) a first damper mounted to said occupant cabin, in a position near said opening in said exterior structure of said occupant cabin, whereby said first damper can be selectively opened, which places the interior of said occupant cabin in fluid communication with said duct, or closed, which effectively isolates said occupant cabin from said duct;

(m) wherein said fan is constructed such that, a speed or direction of motion of an impeller of said fan, or an orientation of one or more blades of said impeller of said fan can be controlled, such that a rate or direction of an air flow created by said fan can be controlled;

(n) a second damper designed to be mounted to said occupant cabin, in a position such that it would surround at least a portion of said impeller of said fan;

(o) an outer wall of said second damper which defines openings through which air can pass;

(p) an air control gate disposed such that said air control gate surrounds said outer wall of said second damper;

(q) wherein said air control gate defines openings through itself which are positioned around a periphery of said air control gate;

(r) wherein a distance between said openings defined in said air control gate is similar to a distance between said openings defined in said outer wall of said second damper; and (s) wherein said air control gate can be rotated such that said openings defined in said air control gate can be placed into or out of alignment with said openings in said outer wall of said second damper such that said openings in said outer wall of said second damper can be selectively exposed or covered by said air control gate.

8. The Vehicle of claim 7, further comprising:

(a) one or more wire form safety screens fixedly attached to said occupant cabin or components of said ventilation system; and (b) wherein said wire form safety screens cover one or more openings in said ventilation system through which foreign objects could otherwise travel and enter a space generally coincident with said impeller of said fan.

(c) a debris screen mounted inside said duct near said second end of said duct;

(d) wherein said debris screen covers an entire cross section of an interior of said duct, such that debris from the outside atmosphere is prevented from traveling through said ventilation system into the interior of said occupant cabin.

9. A ventilation system, for mounting to a vehicle which has an occupant cabin which surrounds an interior of the occupant cabin and is surrounded by an exterior of the occupant cabin, wherein the occupant cabin has an exterior structure, and a roof, sides and rear panel, all of which have an inner and an outer surface and outer edges, and make up part of the exterior structure of the occupant cabin, and wherein one or more components of the exterior structure of the occupant cabin define an opening through an upper portion of the exterior structure of the occupant cabin, comprising:

(a) a duct mountable to the occupant cabin;

(b) an outer wall of a first end of said duct, which can be mated to the outer surface of the one or more components of the exterior structure which define(s) the opening in the exterior structure of the occupant cabin, wherein said outer wall of said first end of said duct is designed to at least partially surround the opening in the exterior structure of the occupant cabin when said ventilation system is installed, thus, an interior of said duct would be in fluid communication with the opening in the exterior structure of the occupant cabin when said ventilation system is installed;

(c) a second end of said duct, which is designed to be positioned below said first end of said duct when said ventilation system is installed;

(d) wherein said second end of said duct is designed to be open to and in fluid communication with outside atmosphere when said ventilation system is installed;

(e) a fan designed to be mounted to the occupant cabin in a position such that an inlet or exhaust area of said fan would be near and would be in fluid communication with the opening in the exterior structure of the occupant cabin when said ventilation system is installed and thus when said fan is in operation it would create air flow toward or away from the opening in the exterior structure of the occupant cabin when said ventilation system is installed;

(t) a damper designed to be mounted to said occupant cabin, in a position such that it would surround at least a portion of said impeller of said fan;

(u) an outer wall of said damper which defines openings through which air can pass;

(v) an air control gate disposed such that said air control gate surrounds said outer wall of said damper;

(w) wherein said air control gate defines openings through itself which are positioned around a periphery of said air control gate;

(x) wherein a distance between said openings defined in said air control gate is similar to a distance between said openings defined in said outer wall of said damper; and (f) wherein said air control gate can be rotated such that said openings defined in said air control gate can be placed into or out of alignment with said openings in said outer wall of said damper such that said openings in said outer wall of said damper can be selectively exposed or covered by said air control gate.

10. A vehicle, comprising:

(a) a chassis;

(b) a suspension engaged to said chassis for supporting said vehicle;

(c) a powertrain engaged to said chassis for driving said vehicle;

(d) an occupant cabin engaged to said chassis;

(e) an exterior structure of said occupant cabin which is comprised of a floor, two sides, a rear panel and a roof;

(f) one or more components of said exterior structure of said occupant cabin defining an opening through said exterior structure in an upper portion of said occupant cabin, such that, air can move through said opening in said exterior structure between an interior space of said occupant cabin and the outside atmosphere;

(g) a duct mounted to said occupant cabin;

(h) an outer wall of a first end of said duct, mated to an outer surface of said one or more components of said exterior structure which define(s) said opening in said exterior structure of said occupant cabin, wherein said outer wall of said first end of said duct at least partially surrounds said opening in said exterior structure of said occupant cabin, thus an interior of said duct is in fluid communication with said opening in said exterior structure of said occupant cabin;

(i) a second end of said duct, positioned below said first end of said duct;

(j) wherein said second end of said duct is open to and in fluid communication with the outside atmosphere;

(k) a fan mounted to said occupant cabin in a position such that an inlet or exhaust area of said fan is near and is in fluid communication with said opening in said exterior structure of said occupant cabin and thus when said fan is operated it creates an air flow toward or away from said opening in said exterior structure of said occupant cabin;

(l) a damper designed to be mounted to said occupant cabin, in a position such that it would surround at least a portion of said impeller of said fan;

(m) an outer wall of said damper which defines openings through which air can pass;

(n) an air control gate disposed such that said air control gate surrounds said outer wall of said damper;

(o) wherein said air control gate defines openings through itself which are positioned around a periphery of said air control gate;

(p) wherein a distance between said openings defined in said air control gate is similar to a distance between said openings defined in said outer wall of said damper; and (q) wherein said air control gate can be rotated such that said openings defined in said air control gate can be placed into or out of alignment with said openings in said outer wall of said damper such that said openings in said outer wall of said damper can be selectively exposed or covered by said air control gate.

* * * * *